United States Patent
Motta et al.

(10) Patent No.: US 6,726,103 B1
(45) Date of Patent: Apr. 27, 2004

(54) IMAGING SYSTEM WITH BUILT-IN DIAGNOSTICS

(75) Inventors: Ricardo J. Motta, Palo Alto, CA (US); Robert Weinschenk, Los Gatos, CA (US)

(73) Assignee: PiXIM, Inc., Mountain View, CA (US)

( * ) Notice: Subject to any disclaimer, the term of this patent is extended or adjusted under 35 U.S.C. 154(b) by 0 days.

(21) Appl. No.: 10/045,877

(22) Filed: Nov. 7, 2001

(51) Int. Cl.$^7$ ................................................ G06S 7/10
(52) U.S. Cl. .................. 235/454; 235/487; 235/462.25; 250/214.1; 250/332; 250/557; 356/492
(58) Field of Search ................................. 235/454, 487, 235/462.25; 250/214.1, 332, 557; 356/492

(56) References Cited

U.S. PATENT DOCUMENTS

| | | | | |
|---|---|---|---|---|
| 5,461,425 A | * | 10/1995 | Fowler et al. | 348/294 |
| 5,594,248 A | * | 1/1997 | Tanaka | 250/332 |
| 6,293,465 B1 | * | 9/2001 | Heller et al. | 235/454 |
| 6,307,393 B1 | * | 10/2001 | Shimura | 324/765 |
| 6,381,357 B1 | * | 4/2002 | Tan et al. | 382/141 |
| 6,478,223 B1 | * | 11/2002 | Ackley | 235/462.04 |
| 6,484,280 B1 | * | 11/2002 | Moberly | 714/726 |
| 6,498,831 B2 | * | 12/2002 | Granfors et al. | 378/98.8 |
| 6,504,572 B2 | * | 1/2003 | Kramer et al. | 348/246 |
| 6,525,304 B1 | * | 2/2003 | Merrill et al. | 250/208.1 |
| 6,526,366 B1 | * | 2/2003 | Dunton | 702/116 |

* cited by examiner

Primary Examiner—Thien M. Le
Assistant Examiner—Allyson N. Sanders
(74) Attorney, Agent, or Firm—Steve Mendelsohn; Yuri Gruzdkov; Joe Zheng

(57) ABSTRACT

An imaging system with built-in diagnostics and preferably implemented as an integrated system-on-a-chip (SOC) imaging system. According to one implementation of the present invention, the imaging system can be operated in two operating modes: a normal operating mode and a special diagnostic mode. While running in the diagnostic mode, the imaging system can be configured to detect manufacturing defects. The imaging system can be further configured to compensate for certain types of manufacturing defects. While running in the diagnostic mode, the imaging system (1) identifies pixels that function incorrectly and (2) creates a record of such pixels. In the normal operating mode, the imaging system can use the record to compensate for the missing or incorrect data from these defective pixels during real-time image processing. The present invention simplifies testing of imaging systems and/or image sensors. It also increases manufacturing yield and, therefore, results in lower per-unit manufacturing cost.

31 Claims, 7 Drawing Sheets

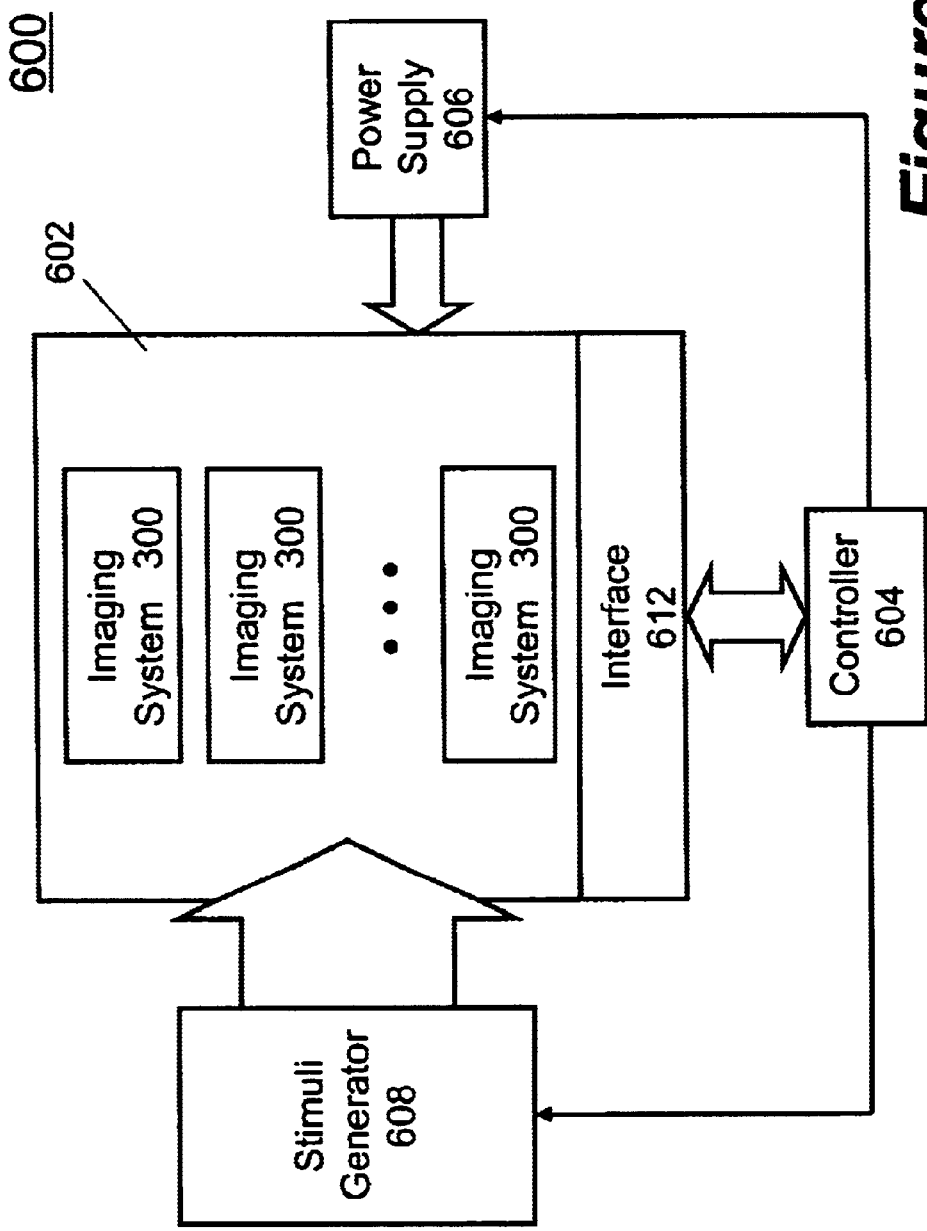

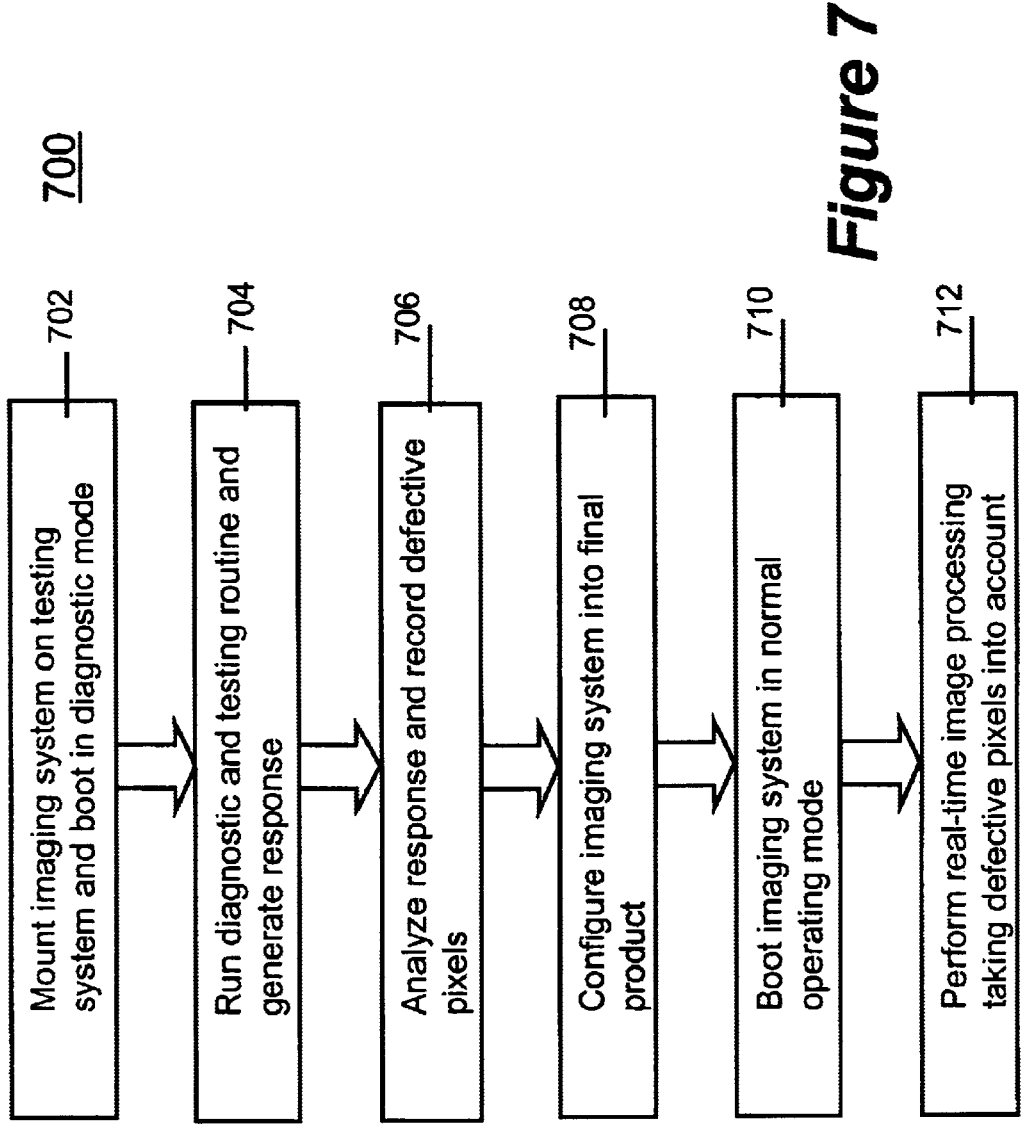

IMAGING SYSTEM WITH BUILT-IN DIAGNOSTICS

BACKGROUND OF THE INVENTION

1. Field of the Invention

The present invention relates to the field of image sensors and imaging systems.

2. Description of the Related Art

An integrated image sensor is used to convert light impinging on the sensor into electrical signals. An image sensor typically includes one or more (e.g., an array of) photoelements such as photodiodes, phototransistors, or other types of photodetectors, where electrical signals are generated via the well-known photoelectric effect. These signals may then be used, for example, to provide information about light intensity, color, or the optical image focused on the sensor. One common type of image sensor is a CMOS image sensor.

FIG. 1 shows a schematic top view of a CMOS image sensor 100 implemented in a single integrated circuit or chip. Sensor 100 comprises a photoelement array 102, a decoding/buffer area 104, and control, processing, and input/output (I/O) circuitry 106. Photoelement array 102 comprises an array of photoelements and associated circuitry such as switches and amplifiers. Each photoelement and its associated circuitry are collectively referred to as a pixel. Image sensors, such as sensor 100, may be used in imaging systems, such as digital cameras.

Testing and manufacturing yield can have a substantial influence on the ultimate cost of a chip. Testing is done to detect circuit defects to prevent customer returns. Ideally, the defects are detected early in the manufacturing process to avoid unnecessary fabrication costs for defective chips. Often, such testing is carried out using high-speed testing systems on the bare die on a wafer before the circuit is packaged.

FIG. 2 shows a schematic block diagram of a typical testing system 200 that can be used for testing image sensors, such as sensor 100 of FIG. 1, prior to; packaging. Testing system 200 comprises a testing platform 202, a controller 204, a power supply 206, and a stimuli generator 208. The device under test (DUT), in this particular case, unpackaged image sensor wafer 100, is mounted on platform 202, which comprises control and support circuitry 210 and an interface 212. Controller 204 is a software-driven device that controls platform 202, supply 206, and generator 208. Generator 208 is a calibrated light source that provides optical input for sensor 100 when instructed to by controller 204. Controller 204 performs a specific test function on sensor 100 using interface 212 and circuitry 210. The overall test procedure may have a sequence of such functions. Controller 204 receives test data generated by sensor 100 through interface 212, analyzes the data, and determines if sensor 100 performed according to the specifications using a set of predetermined criteria stored in the controller's memory. If the criteria are satisfied, then sensor 100 is marked for later packaging. If the criteria are not satisfied, then the sensor is marked defective and is usually discarded.

A problem with this approach is that testing on the bare die may not reveal all defective sensors. Unlike many other integrated circuits, integrated image sensors, such as sensor 100, due to certain specific characteristics, also have to be tested after final assembly. For example, an image sensor should be free of (1) optical obstructions in the photosensitive area and (2) optical system defects, such as microlens defects. These types of defects can be detected only after the chip has been packaged.

To accommodate this requirement, a test procedure may involve multiple testing stages. For example, in a first testing stage, often referred to as prescreening, a fast relatively simple test is performed on an unpackaged sensor, for example, using the testing system of FIG. 2. The sensors that fail the prescreening are discarded, while the sensors that pass the prescreening are packaged. In a second testing stage, a more comprehensive test is performed on each packaged device. As with unpackaged sensors, packaged devices that fail the second testing stage are discarded. This second testing stage is often implemented using a testing system functionally similar to testing system 200 of FIG. 2. However, in this case, the testing system is designed to simulate the operation of the packaged sensor in the final product. Consequently, testing systems for the prescreening and the second testing stage may need different equipment. The expense of building multiple testing systems often precludes (1) the use of several testing systems in parallel to speed up testing and/or (2) the use of duplicate testing systems at separate locations. Lastly, there is a need for testing once the sensor has been incorporated into the final system (e.g., a camera). This kind of test is often the most onerous, since the entire final product has to be placed under test, and the hardest to perform, since the sensor will be at that stage connected to the rest of the circuit and the control and diagnostics software might not yet be built into the final system. A system that can self test, detect errors, and correct such errors is not currently available, and would be of great value to many businesses and industries.

SUMMARY OF THE INVENTION

The present invention provides an integrated system-on-a-chip (SOC) imaging system with built-in diagnostics. According to one implementation of the present invention, an imaging system can be operated in two operating modes: a normal operating mode and a diagnostic mode. While running in the diagnostic mode, the imaging system can be configured to detect manufacturing defects for identifying defective chips. In certain embodiments, the imaging system can be further configured to compensate for certain types of manufacturing defects. While running in the diagnostic mode, the imaging system (1) identifies pixels that function incorrectly and (2) creates a record of such pixels. In the normal operating mode, the imaging system can use the record to compensate for the missing or incorrect data from these defective pixels during real-time image processing. The present invention simplifies testing of image sensors by providing an SOC image sensor that can be tested one time using a relatively simple testing system as opposed to the relatively complex multi-stage multi-system testing of the prior art. It also increases manufacturing yield by providing compensation for certain types of sensor defects and, therefore, results in lower per-unit manufacturing cost.

According to one embodiment, the present invention is an imaging system comprising an image sensor, a memory, and a processor, wherein the image sensor is configured to generate image signals corresponding to an image of a scene; the memory is configured to store image data corresponding to the image signals; and the processor is configured to control operations of the imaging system in a diagnostic mode and in a normal operating mode, wherein, during the diagnostic mode, the processor analyzes the image data to determine if the image sensor is defective.

According to another embodiment, the present invention is a method for fabricating an imaging system comprising the steps of (a) forming an image sensor configured to generate image signals corresponding to an image of a scene; (b) forming a memory configured to store image data corresponding to the image signals; and (c) forming a processor configured to control operations of the imaging system in a diagnostic mode and in a normal operating mode, wherein, during the diagnostic mode, the processor analyzes the image data to determine if the image sensor is defective.

According to yet another embodiment, the present invention is an imaging system comprising an image sensor, a memory, and a processor, wherein the image sensor is configured to generate image signals corresponding to an image of a scene; the memory is configured to store image data corresponding the image signals; and the processor is configured to control operations of the imaging system in a normal operating mode, wherein, during the normal operating mode, the processor processes the image data to compensate for one or more defective pixels in the image sensor.

BRIEF DESCRIPTION OF THE DRAWINGS

Other aspects, features, and advantages of the present invention will become more fully apparent from the following detailed description, the appended claims, and the accompanying drawings in which:

FIG. 6 shows a schematic block diagram of an alternative implementation of a testing system to test a plurality of imaging systems; and FIG. 7 is a flowchart illustrating a method of detecting and compensating for manufacturing defects in the imaging system of FIG. 3 according to one implementation of the present invention.

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. The description herein is largely based on a particular imaging system based on CMOS technology and system-on-a-chip (SOC) imaging system architecture. Those skilled in the art can appreciate that the description can be equally applied to other imaging systems.

Figure 3:
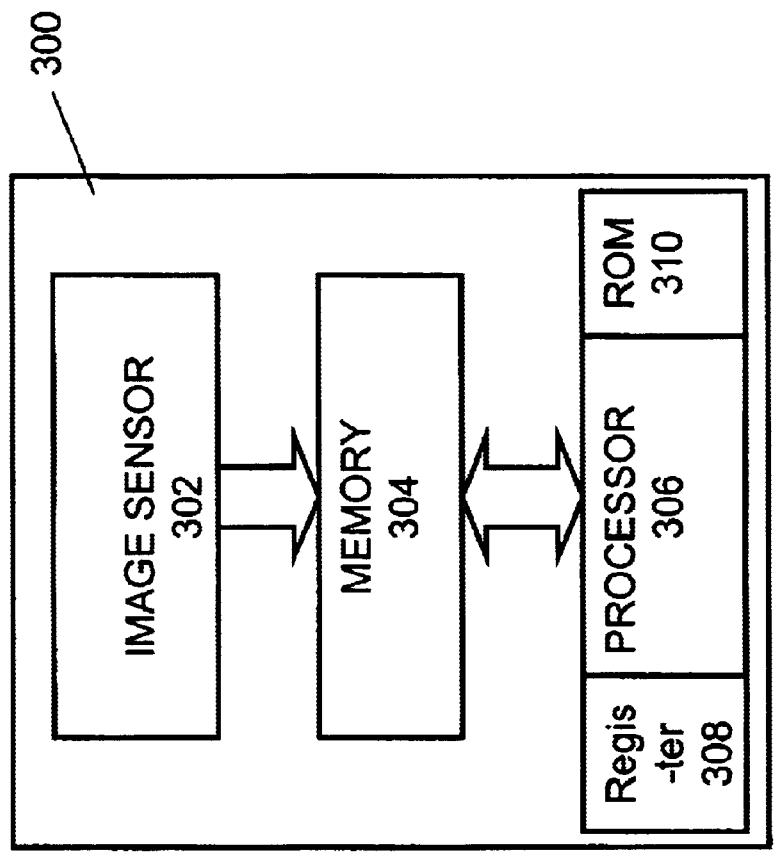
FIG. 3 shows a schematic block diagram of an imaging system according to one embodiment of the present invention.

FIG. 3 shows a schematic block diagram of an imaging system 300 according to one embodiment of the present invention. System 300 comprises a digital image sensor 302, an on-chip memory 304, a processor 306, a register 308, and a read-only memory (ROM) 310, all implemented on a single chip as an SOC. Sensor 302 is configured to generate digital image data in response to incident light and transfer the data to memory 304. Processor 306 is configured to access and process the data stored in the memory. Data processing may include but is not limited to data interpolation, noise reduction, color adjustment, and/or geometric corrections due to optical aberrations.

Figure 4:
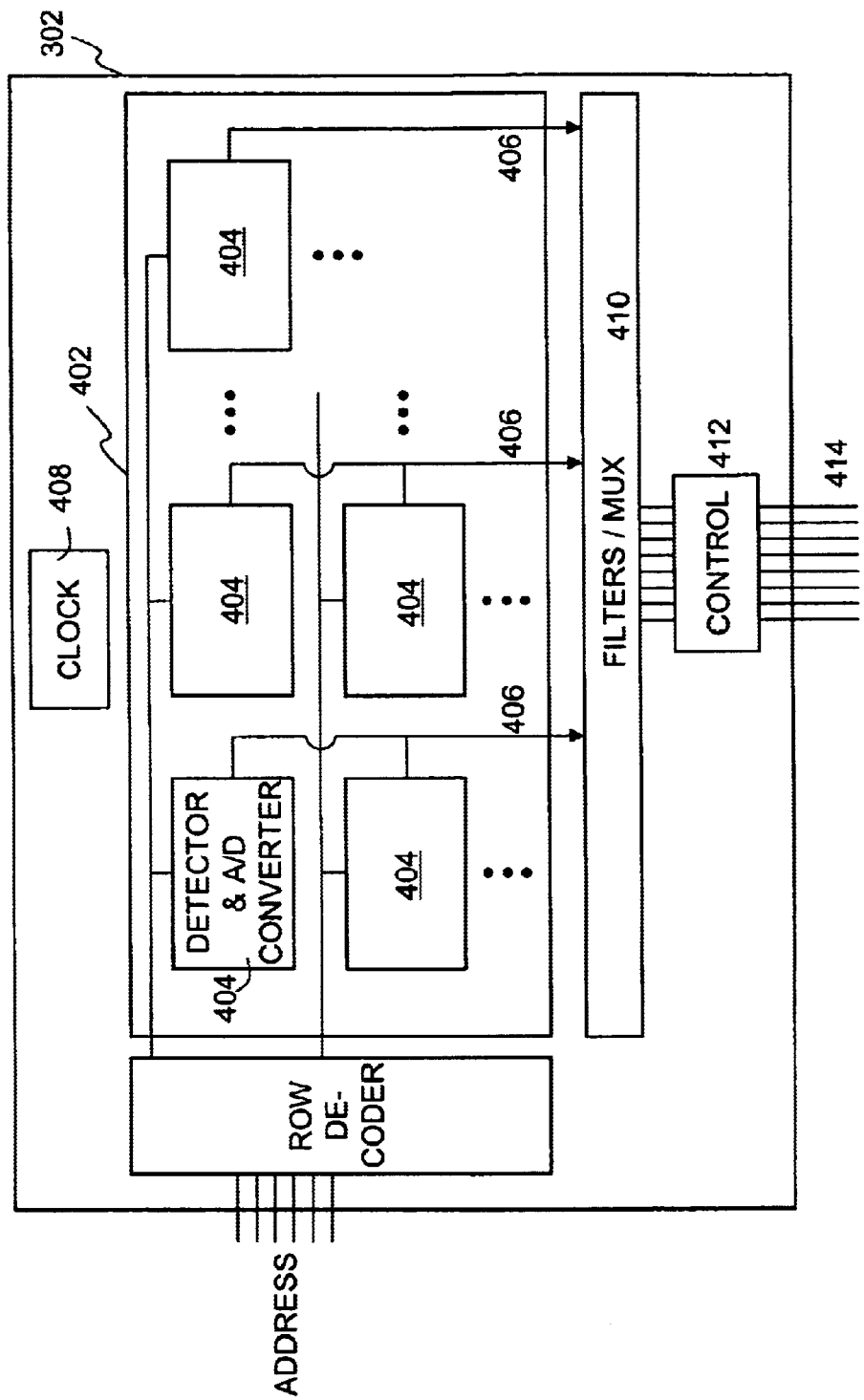
FIG. 4 is a schematic block diagram of an image sensor that may be used in the system of FIG. 3.

FIG. 4 shows a schematic block diagram of a digital pixel sensor (DPS) array that can be used as image sensor 302 of system 300. One particular implementation of image sensor 302 is described in U.S. Pat. No. 5,461,425 (Fowler et al.), the teachings of which are incorporated herein by reference. Sensor 302 comprises an array 402 of photoelements and associated circuitry, such as switches and amplifiers. Each photoelement and its associated circuitry are collectively referred to as a pixel 404. Each pixel 404 of array 402 has a dedicated analog-to-digital converter (ADC) (not shown). In response to incident light, the photoelement in each pixel generates analog signals, such as current or voltage, representative of the light intensity. These analog signals are converted by the ADC in each pixel of array 402 into a serial bit stream and transferred via a corresponding bit line 406. ADC outputs are synchronized using a common clock driver 408. Each clocked bit stream is then processed by filters 410 to derive a digital value representative of the intensity of light incident on the corresponding pixel 404. Digital values can then be output from sensor 302 to memory 304 of FIG. 3 for storage and further processing via a control circuit 412 and bus 414.

Referring again to FIG. 3, read-only memory 310 is configured to store internal bootable software. This software comprises normal operating routines and special diagnostic routines. These diagnostic routines simplify test equipment for imaging system 300 since very minimal external support is required to carry out a testing procedure for system 300. Consequently, a testing system for system 300 can be significantly simpler compared to prior art testing system 200 of FIG. 2.

Figure 5:
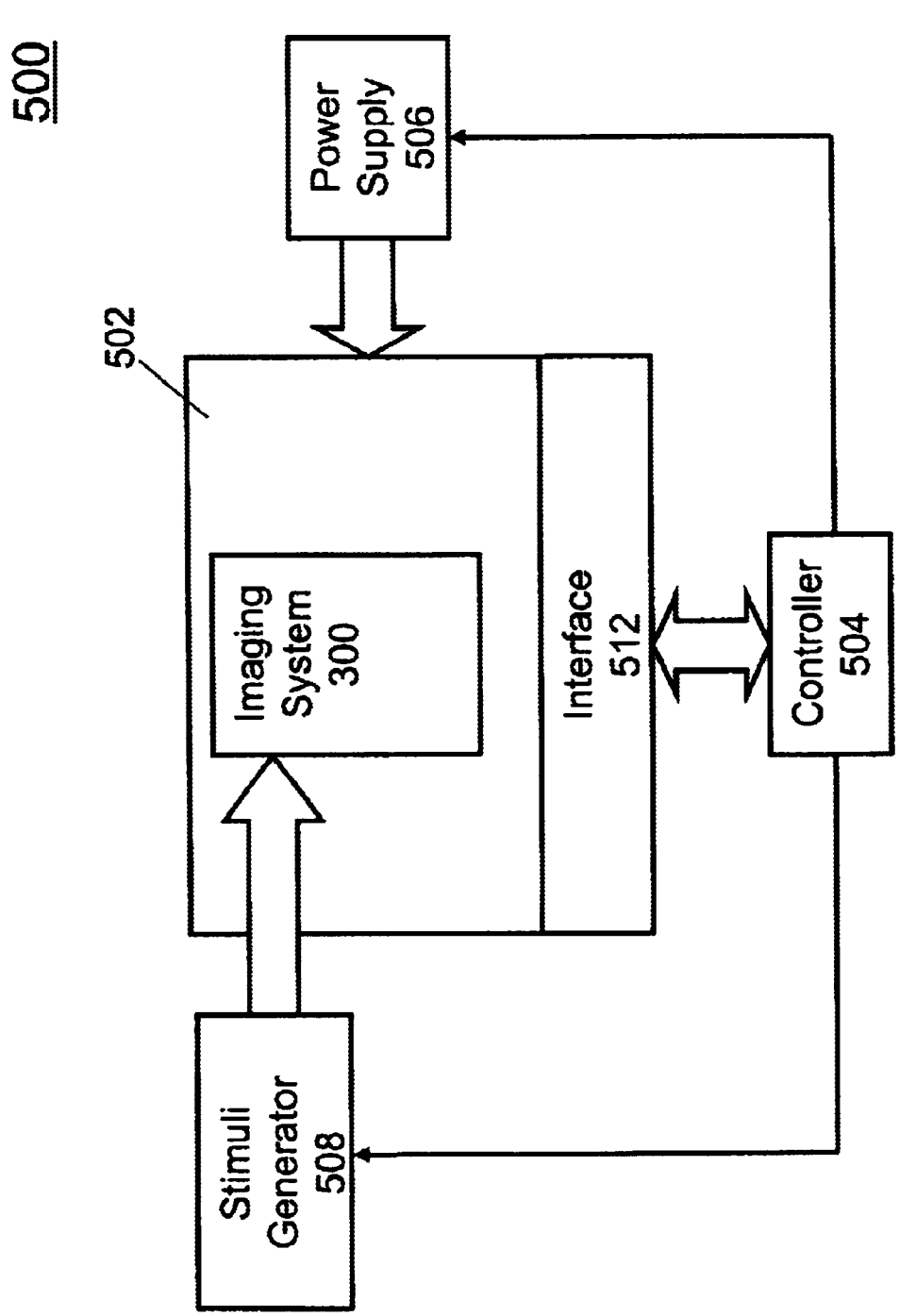
FIG. 5 shows a schematic block diagram of one implementation of a testing system to test the imaging system of FIG. 3.

FIG. 5 shows a schematic block diagram of a testing system 500 that can be used to test imaging system 300 of FIG. 3. Testing system 500 comprises a testing platform 502 having interface 512, a controller 504, a power supply 506, and a stimuli generator 508. Generator 508 is a calibrated light source similar to generator 208 of testing system 200. Imaging system 300 (i.e., the DUT) is mounted on platform 502. Unlike image sensor 100, which requires different testing system before and after packaging, imaging system 300 can be tested at different stages using a single testing system, such as testing system 500 of FIG. 5. Imaging system 300 can be mounted on testing system 500 using a relatively simple mount, e.g., a surface probe or simple socket. Consequently, platform 502 can have a relatively simple circuit board comprising power contacts and toggles for the pins of imaging system 300.

Figure 2:
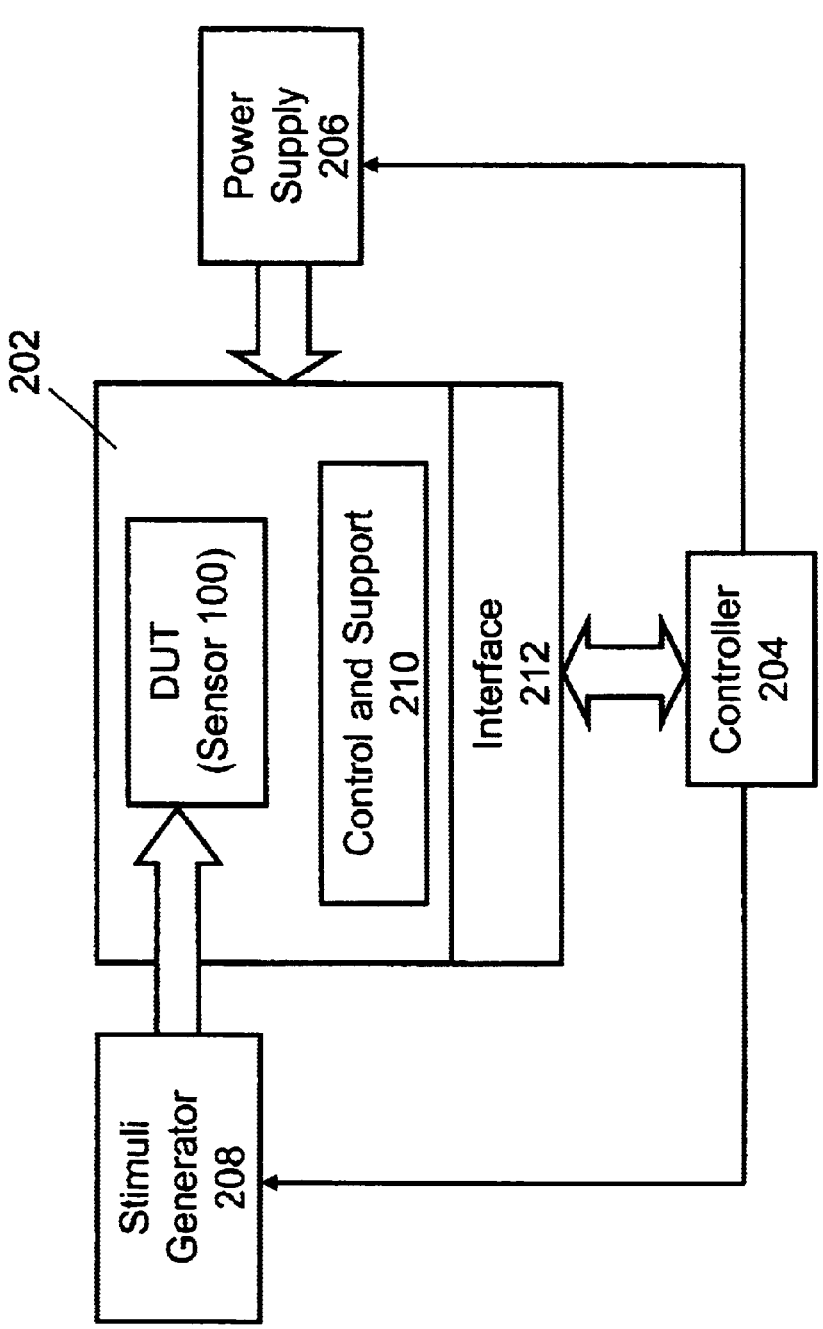
FIG. 2 is a schematic block diagram of a testing system of the prior art.

Unlike the complex functions of controller 204 of testing system 200 of FIG. 2, controller 504 of testing system 500 has a simplified function of booting imaging system 300 into its diagnostic mode. This can be done by a variety of methods, such as supplying a voltage pattern of logical "0" and/or logical "1" values to one or more package pins of system 300. After imaging system 300 has been booted in the diagnostic mode, controller 504 communicates with it through interface 512. According to instructions received from processor 306 of imaging system 300, controller 504 steps generator 508 through a set of predetermined operations in synchronization with a diagnostic routine executed by processor 306. Data generated by image sensor 302 during the diagnostic routine are processed and analyzed by processor 306 using a set of predetermined criteria stored, e.g., in ROM 310, to generate test results. The test results can be stored on-chip in system 300, e.g., in register 308, and/or off-chip, e.g., on a magnetic disk (not shown).

Due to fewer testing stages for testing imaging system 300, the relative simplicity of testing platform 502, and the simplified functions of controller 504, testing system 500 can be relatively simple and inexpensive compared to a typical testing system of the prior art, such as testing system 200 of FIG. 2. This makes it more economical to have multiple testing systems at one location to enable parallel testing of devices or to have such testing systems installed at multiple locations to enable post-manufacturing and/or customer quality control.

FIG. 6 shows a schematic block diagram of an alternative testing system 600 that can be used for testing imaging systems, such as imaging system 300 of FIG. 3. Testing system 600 is similar to testing system 500 of FIG. 5, except that testing system 600 is configured to accommodate a plurality of DUTs, such as imaging system 300, as opposed to a single DUT for testing system 500. Testing system 600 is relatively simple because very minimal external support is required to carry out a testing procedure for each individual imaging system 300. Functions of controller 604 are similar to those of controller 504 of testing system 500. An additional responsibility of controller 604 compared to controller 504 is to synchronize certain steps in the diagnostic routines executed by each individual processor 306 of each individual imaging system 300 mounted for testing on system 600 with a single stimuli generator 608. Using testing system 600, parallel testing of multiple imaging systems, such as imaging system 300, can be implemented in a relatively simple and inexpensive way.

Figure 1:
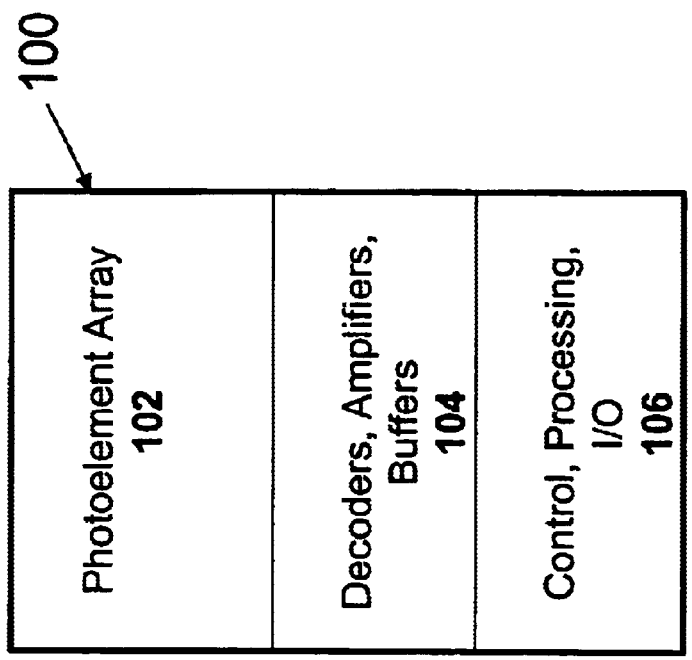
FIG. 1 shows a schematic top view of an integrated CMOS image sensor of the prior art.

The manufacturing yield of image sensors, such as sensor 100, and SOC imaging systems, such as system 300, is typically correlated to pixel defects. Often, a large array (e.g., 512×512) of pixels in an image sensor or imaging system may have only a few pixels that do not perform according to the specifications. Often, such pixels are isolated, e.g., each defective pixel has neighboring pixels that work properly. In an SOC implementation, an imaging system, such as system 300, can be configured to compensate for this type of manufacturing defect using the test results generated during the diagnostic routine described above. Similar compensation processing may also be performed for non-SOC systems, including those implemented using prior art image sensors, such as sensor 100 of FIG. 1, that are tested using prior-art testing systems, such as system 200 of FIG. 2. This capability may substantially increase manufacturing yield of both SOC imaging systems and non-SOC image sensors and, thus, lower the per-unit cost.

FIG. 7 shows a flowchart illustrating a method 700 of detecting and compensating for manufacturing defects in an imaging system, such as system 300 of FIG. 3, according to one implementation. In step 702 of method 700, a packaged SOC imaging system 300 is mounted on a testing system, such as testing system 500 of FIG. 5, and booted in its diagnostic mode. In step 704, imaging system 300 and testing system 500 are stepped through a diagnostic routine to generate a response pattern of image sensor 302.

In step 706, the response pattern is analyzed by processor 306 to identify defective pixels, if any, in image sensor 302, and the addresses and characteristics of these pixels are recorded for use during subsequent real-time image processing. The recorded characteristics of a defective pixel may include, but are not limited to, the deviation of "dark" counts (in the absence of light) from those in the specification, a fixed offset (positive or negative), a light-intensity-to-digital-counts conversion factor, or the type of defect (e.g., no data or permanent saturation). In one embodiment of step 706 of method 700, the addresses of the defective pixels can be permanently recorded in register 308 of imaging system 300. Numerous other techniques can be employed to record the identity of such pixels. For example, in one embodiment, the pixel addresses can be recorded in a programmable read-only memory located on-chip, such as ROM 310 of system 300. In an alternative embodiment, the pixel addresses can be recorded off-chip, e.g., on a magnetic disk.

In the prior art, following the prescreening, the common practice is to discard defective unpackaged chips having certain types of defects. However, in view of the present invention and depending on the intended application, defective unpackaged chips may be sorted into categories according to the number and distribution of defects. Some categories of the defective unpackaged chips that are deemed correctable may be packaged. According to certain embodiments of the present invention, once the identity and characteristics of defective pixels, if any, have been recorded, in step 708, the packaged SOC imaging system 300 is configured into a final product (e.g., a video camera or digital camera). Once the final product is assembled, imaging system 300 can be booted in its normal operating mode in step 710. In step 712, image-processing algorithms can use the recorded information about defective pixels during the normal operating mode to compensate for the missing or incorrect data from these pixels. For example, the data for a defective pixel can be approximated using interpolation of image data from the neighboring pixels or using other image-processing techniques. Similar real-time compensation for defective pixels can be implemented even for sensors or imaging systems that are tested using prior-art-testing systems, such as system 200 of FIG. 2.

In general, the present invention may be implemented for imaging systems having image sensors with one or more pixels arranged in either a one- or two-dimensional pattern, such as an array of pixels arranged in rows and columns. Photoelements in each pixel may be based on any suitable light-sensitive device, such as, for example, a photodiode, a phototransistor, a photogate, photo-conductor, a charge-coupled device, a charge-transfer device, or a charge-injection device. Similarly, as used in this specification, the term "light" refers to any suitable electromagnetic radiation in any wavelength and is not necessarily limited to visible light.

While this invention has been described with reference to illustrative embodiments, this description is not intended to be construed in a limiting sense. Various modifications of the described embodiments, as well as other embodiments of the invention, which are apparent to persons skilled in the art to which the invention pertains are deemed to lie within the principle and scope of the invention as expressed in the following claims. For example, software enabling the diagnostic mode for an imaging system may be stored off-chip and loaded into the imaging system from the testing system during boot-up.

Although the present invention has been described with reference to digital image sensors and SOC imaging system architecture, it can also be practiced for analog image sensors. For an SOC imaging system with an analog image sensor, the system may also need to include one or more analog-to-digital converters to convert the analog image signals into digital image data for storage in the memory.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. An imaging system comprising an image sensor, a memory, and a processor, wherein:

the image sensor and the memory are implemented in a single integrated circuit;

the image sensor is a digital pixel sensor configured to generate digital image data corresponding to an image of a scene for storage in the memory;

the memory is configured to store the digital image data corresponding to the image; and the processor is configured to control operations of the imaging system in a diagnostic mode and in a normal operating mode, wherein, during the diagnostic mode, the processor analyzes the digital image data to determine if the image sensor is defective and, prior to operating the image sensor in the normal operating mode, no physical modifications are made to the image sensor in response to identifying one or more defective pixels in the image sensor during the diagnostic mode.

2. The invention of claim 1, wherein:

the image sensor, the memory, and the processor are implemented as a system-on-a-chip (SOC) in the single integrated circuit.

3. The invention of claim 1, wherein:

the image sensor, the memory, and the processor are implemented as a system-on-a-chip (SOC) in the single integrated circuit; and the diagnostic mode enables the imaging system to be tested using a testing system, wherein:

a test controller different from the processor generates instructions for controlling test operations of the testing system;

the testing system provides a set of light stimuli for the image sensor in response to the instructions;

the processor generates test results based on the digital image data indicating whether the image sensor is defective;

the test results are stored in the imaging system for access by the processor during the normal operating mode;

the test results identify a set of one or more defective pixels in the image sensor;

the imaging system is configured to use the test results during the normal operating mode to compensate for the one or more defective pixels identified during the diagnostic mode; and the testing system is configured to test a packaged image sensor.

4. The invention of claim 3, wherein:

no diagnostic testing is performed on the image sensor to identify the one or more defective pixels in the image sensor prior to assembling the image sensor into the packaged image sensor; and the testing system is adapted to test multiple instances of the imaging system simultaneously.

5. An imaging system comprising an image sensor, a memory, and a processor, wherein:

the image sensor and the memory are implemented in a single integrated circuit;

the image sensor is a digital pixel sensor configured to generate digital image data corresponding to an image of a scene for storage in the memory;

the memory is configured to store the digital image data corresponding to the image;

the processor is configured to control operations of the imaging system in a diagnostic mode and in a normal operating mode, wherein, during the diagnostic mode, the processor analyzes the digital image data to determine if the image sensor is defective; and the diagnostic mode enables the imaging system to be tested using a testing system, wherein:

a test controller different from the processor generates instructions for controlling test operations of the testing system;

the testing system provides a set of light stimuli for the image sensor in response to the instructions; and the processor generates test results based on the digital image data indicating whether the image sensor is defective.

6. The invention of claim 5, wherein the test results are stored in the imaging system for access by the processor during the normal operating mode.

7. The invention of claim 5, wherein the test results identify a set of one or more defective pixels in the image sensor.

8. The invention of claim 5, wherein the imaging system is configured to use the test results during the normal operating mode to compensate for one or more defective pixels identified during the diagnostic mode.

9. The invention of claim 5, wherein the testing system is configured to test a packaged image sensor.

10. The invention of claim 5, wherein the testing system is adapted to test multiple instances of the imaging system simultaneously.

11. A method for fabricating an imaging system comprising the steps of:

(a) forming an image sensor configured to generate digital image data corresponding to an image of a scene, wherein the image sensor is a digital pixel sensor;

(b) forming a memory configured to store the digital image data corresponding to the image, wherein the image sensor and the memory are implemented in a single integrated circuit; and (c) forming a processor configured to control operations of the imaging system in a diagnostic mode and in a normal operating mode, wherein, during the diagnostic mode, the processor analyzes the digital image data to determine if the image sensor is defective and, prior to operating the image sensor in the normal operating mode, no physical modifications are made to the image sensor in response to identifying one or more defective pixels in the image sensor during the diagnostic mode.

12. The invention of claim 11, wherein:

the image sensor, the memory, and the processor are implemented as a system-on-a-chip (SOC) in the single integrated circuit.

13. The invention of claim 11, wherein:

the image sensor, the memory, and the processor are implemented as a system-on-a-chip (SOC) in the single intergrated circuit; and the diagnostic mode enables the imaging system to be tested using a testing system, wherein:

a test controller different from the processor generates instructions for controlling test operations of the testing system;

the testing system provides a set of light stimuli for the image sensor in response to the instructions;

the processor generates test results based on the digital image data indicating whether the image sensor is defective;

the test results are stored in the imaging system for access by the processor during the normal operating mode;

the test results identify a set of one or more defective pixels in the image sensor;

the imaging system is configured to use the test results during the normal operating mode to compensate for the one or more defective pixels identified during the diagnostic mode; and the testing system is configured to test a packaged image sensor.

14. The invention of claim 13, wherein:

no diagnostic testing is performed on the image sensor to identify the one or more defective pixels in the image sensor prior to assembling the image sensor into the packaged image sensor; and the testing system is adapted to test multiple instances of the imaging system simultaneously.

15. A method for fabricating an imaging system comprising the steps of:

(a) forming an image sensor configured to generate digital image data corresponding to an image of a scene, wherein the image sensor is a digital pixel sensor;

(b) forming a memory configured to store the digital image data corresponding to the image, wherein the image sensor and the memory are implemented in a single integrated circuit; and (c) forming a processor configured to control operations of the imaging system in a diagnostic mode and in a normal operating mode, wherein during the diagnostic mode, the processor analyzes the digital image data to determine if the image sensor is defective and the diagnostic mode enables the imaging system to be tested using a testing system, wherein:

a test controller different from the processor generates instructions for controlling test operations of the testing system;

the testing system provides a set of light stimuli for the image sensor in response to the instructions; and the processor generates test results based on the digital image data indicating whether the image sensor is defective.

16. The invention of claim 15, wherein the test results are stored in the imaging system for access by the processor during the normal operating mode.

17. The invention of claim 15, wherein the test results identify a set of one or more defective pixels in the image sensor.

18. The invention of claim 15, wherein the imaging system is configured to use the test results during the normal operating mode to compensate for one or more defective pixels identified during the diagnostic mode.

19. The invention of claim 15, wherein the testing system is configured to test a packaged image sensor.

20. The invention of claim 15, wherein the testing system is adapted to test multiple instances of the imaging system simultaneously.

21. An imaging system comprising an image sensor, a memory, and a processor, wherein:

the image sensor and the memory are implemented in a single integrated circuit;

the image sensor is a digital pixel sensor configured to generate digital image data corresponding to an image of a scene for storage in the memory;

the memory is configured to store the digital image data corresponding to the image;

the processor is configured to control operations of the imaging system in a normal operating mode, wherein, during the normal operating mode, the processor processes the digital image data to compensate for one or more defective pixels in the image sensor; and the processor is further configured to control operations of the imaging system in a diagnostic mode, wherein, during the diagnostic mode, the processor analyzes the digital image data to identify the one or more defective pixels in the image sensor and, prior to operating the image sensor in the normal operating mode, no physical modifications are made to the image sensor in response to identifying the one or more defective pixels in the image sensor during the diagnostic mode.

22. The invention of claim 21, wherein:

the image sensor, the memory, and the processor are implemented as a system-on-a-chip (SOC) in the single integrated circuit.

23. The invention of claim 21, wherein:

the image sensor, the memory, and the processor are implemented as a system-on-a-chip (SOC) in the single integrated circuit; and the diagnostic mode enables the imaging system to be tested using a testing system, wherein:

a test controller different from the processor generates instructions for controlling test operations of the testing system;

the testing system provides a set of light stimuli for the image sensor in response to the instructions;

the processor generates test results based on the digital image data indicating whether the image sensor is defective;

the test results are stored in the imaging system for access by the processor during the normal operating mode; and the testing system is configured to test a package image sensor.

24. The invention of claim 23, wherein:

no diagnostic testing is preformed on the image sensor to identify the one or more defective pixels in the image sensor prior to assembling the image sensor into the packaged image sensor; and the testing system is adapted to test multiple instances of the imaging system simultaneously.

25. An imaging system comprising an image sensor, a memory, and a processor, wherein:

the image sensor and the memory are implemented in a single integrated circuit;

the image sensor is a digital pixel sensor configured to generate digital image data corresponding to an image of a scene for storage in the memory;

the memory is configured to store the digital image data corresponding to the image; and the processor is configured to control operations of the imaging system in a normal operating mode, wherein, during the normal operating mode, the processor processes the digital image data to compensate for one or more defective pixels in the image sensor;

the processor is further configured to control operations of the imaging system in a diagnostic mode, wherein, during the diagnostic mode, the processor analyzes the digital image data to identify the one or more defective pixels in the image sensor and the diagnostic mode enables the imaging system to be tested using a testing system, wherein:

a test controller different from the processor generates instructions for controlling test operations of the testing system;

the testing system provides a set of light stimuli for the image sensor in response to the instructions; and the processor generates test results based on the digital image data indicating whether the image sensor is defective.

26. The invention of claim 25, wherein the test results are stored in the imaging system for access by the processor during the normal operating mode.

27. The invention of claim 25, wherein the testing system is configured to test a packaged image sensor.

28. The invention of claim 25, wherein the testing system is adapted to test multiple instances of the imaging system simultaneously.

29. An imaging system comprising an image sensor, a memory, and a processor, wherein:

the image sensor and the memory are implemented in a single integrated circuit;

the image sensor is a digital pixel sensor configured to generate digital image data corresponding to an image of a scene for storage in the memory;

the memory is configured to store the digital image data corresponding to the image;

the processor is configured to control operations of the imaging system in a diagnostic mode and in a normal operating mode, wherein, during the diagnostic mode, the processor analyzes the digital image data to determine if the image sensor is defective; and no diagnostic testing is performed on the image sensor to identify one or more defective pixels in the image sensor prior to assembling the image sensor into a packaged image sensor.

30. A method for fabricating an imaging system comprising the steps of:

(a) forming an image sensor configured to generate digital image data corresponding to an image of a scene, wherein the image sensor is a digital pixel sensor;

(b) forming a memory configured to store the digital image data corresponding to the image, wherein the image sensor and the memory are implemented in a single integrated circuit; and (c) forming a processor configured to control operations of the imaging system in a diagnostic mode and in a normal operating mode, wherein, during the diagnostic mode, the processor analyzes the digital image data to determine if the image sensor is defective and no diagnostic testing is performed on the image sensor to identify one or more defective pixels in the image sensor prior to assembling the image sensor into a packaged image sensor.

31. An imaging system comprising an image sensor, a memory, and a processor, wherein:

the image sensor and the memory are implemented in a single integrated circuit;

the image sensor is a digital pixel sensor configured to generate digital image data corresponding to an image of a scene for storage in the memory;

the memory is configured to store the digital image data corresponding to the image; and the processor is configured to control operations of the imaging system in a normal operating mode, wherein, during the normal operating mode, the processor processes the digital image data to compensate for one or more defective pixels in the image sensor and no diagnostic testing is performed on the image sensor to identify the one or more defective pixels in the image sensor prior to assembling the image, sensor into a packaged image sensor.

* * * * *